United States Patent
Kang et al.

(10) Patent No.: US 9,434,272 B2
(45) Date of Patent: Sep. 6, 2016

(54) BATTERY MANAGEMENT SYSTEM

(71) Applicant: LG CHEM, LTD., Seoul (KR)

(72) Inventors: Ju-Hyun Kang, Daejeon (KR);
Dal-Hoon Lee, Daejeon (KR);
Sang-Hoon Lee, Daejeon (KR);
Dong-Keun Kwon, Daejeon (KR);
Yasuhito Eguchi, Daejeon (KR)

(73) Assignee: LG CHEM, LTD., Seoul (KR)

( * ) Notice: Subject to any disclaimer, the term of this patent is extended or adjusted under 35 U.S.C. 154(b) by 0 days.

(21) Appl. No.: 14/438,125

(22) PCT Filed: Sep. 24, 2014

(86) PCT No.: PCT/KR2014/008897
§ 371 (c)(1),
(2) Date: Apr. 23, 2015

(87) PCT Pub. No.: WO2015/046877
PCT Pub. Date: Apr. 2, 2015

(65) Prior Publication Data
US 2015/0280464 A1 Oct. 1, 2015

(30) Foreign Application Priority Data

Sep. 24, 2013 (KR) .................. 10-2013-0113325
Sep. 17, 2014 (KR) .................. 10-2014-0123697

(51) Int. Cl.
*H02J 7/00* (2006.01)
*B60L 11/18* (2006.01)
*H01M 10/42* (2006.01)

(52) U.S. Cl.
CPC .......... *B60L 11/1851* (2013.01); *H02J 7/0021* (2013.01); *H01M 2010/4271* (2013.01); *H02J 2007/0096* (2013.01)

(58) Field of Classification Search
CPC .................................................. H02J 7/0026

USPC ......................................................... 320/116
See application file for complete search history.

(56) References Cited

U.S. PATENT DOCUMENTS

2005/0083016 A1* 4/2005 Yau ................. H02J 7/0018
320/116
2008/0143543 A1 6/2008 Vandensande et al.
(Continued)

FOREIGN PATENT DOCUMENTS

JP 2008-211962 A 9/2008
KR 10-0680901 B1 2/2007
(Continued)

OTHER PUBLICATIONS

International Search Report, issued in PCT/KR2014/008897, dated Dec. 29, 2014.
(Continued)

*Primary Examiner* — Edward Tso
*Assistant Examiner* — Ahmed Omar
(74) *Attorney, Agent, or Firm* — Birch, Stewart, Kolasch & Birch, LLP

(57) ABSTRACT

The present disclosure discloses a battery management system that uses a small number of opto-couplers to reduce a production cost. The battery management system is controlled to maintain a turn-off state in a normal condition. Also, switches are connected in series, and the switches are connected such that when any one switch turns on, switches connected subsequent to the turned-on switch turn on in sequential order. The turn-on of the last connected switch causes a switch turning on an opto-coupler to be turned on. As a result, when the opto-coupler turns on, a battery management device may transmit information to an external device.

26 Claims, 3 Drawing Sheets

(56) References Cited

U.S. PATENT DOCUMENTS

2008/0211459 A1    9/2008   Choi
2010/0097033 A1    4/2010   Tange
2013/0207613 A1*   8/2013   Loncarevic ........... H02J 7/0016
                                                                                 320/134

FOREIGN PATENT DOCUMENTS

KR     10-2008-0080864 A     9/2008
KR     10-2010-0044123 A     4/2010
KR     10-2011-0027189 A     3/2011
KR     10-2013-0033196 A     4/2013

OTHER PUBLICATIONS

Written Opinion of the International Searching Authority, issued in PCT/KR2014/008897, dated Dec. 29, 2014.

* cited by examiner

BATTERY MANAGEMENT SYSTEM

TECHNICAL FIELD

The present disclosure relates to a battery management system, and more particularly, to a battery management system that uses a small number of opto-couplers to reduce a production cost.

The present application claims priority to Korean Patent Application No. 10-2013-0113325 filed in the Republic of Korea on Sep. 24, 2013 and Korean Patent Application No. 10-2014-0123697 filed in the Republic of Korea on Sep. 17, 2014, the disclosures of which are incorporated herein by reference.

BACKGROUND ART

Due to its characteristics of being easily applicable to various products and electrical characteristics such as a high energy density, a secondary battery is not only commonly applied to a portable device, but universally applied to an electric vehicle (EV), a hybrid vehicle (HV), or an energy storage system that is propelled by an electric motor. This secondary battery is gaining attention for its primary advantage of remarkably reducing the use of fossil fuels and not generating by-products from the use of energy, making it a new eco-friendly and energy efficient source of energy.

A battery pack for use in electric vehicles has a structure consisting of a plurality of battery assemblies connected in series, each battery assembly including a plurality of unit cells, to obtain high voltage. Also, the unit cell includes a cathode current collector and an anode current collector, a separator, an active material, and an electrolyte solution, and allows repeated charging and discharging by electrochemical reactions between the components.

In addition to this basic structure, the battery pack further includes a battery management unit (BMU) to monitor and control a state of a secondary battery by applying an algorithm for control of power supply to a driving load such as a motor, measurement of electrical characteristic values such as current or voltage, charge/discharge control, voltage equalization control, state of charge (SOC) estimation, and the like.

Recently, with the increasing need for a high-capacity structure as well as utilization as an energy storage source, the demand for a battery pack of a multi-module structure in which a plurality of battery modules including a plurality of batteries connected in series and/or in parallel are assembled, is also increasing.

Because the battery pack of the multi-module structure includes a plurality of batteries, there is a limitation in controlling the charge/discharge state of all the batteries using a single BMU. More recently, technology that mounts a BMU in each battery module included in the battery pack to build a battery management system (BMS) is being used.

Because the battery pack of the multi-module structure generally has a high operating voltage, an external device connected to the BMS needs to be electrically separated.

In relation to this, Korean Patent Laid-open Publication No. 10-2011-0027189 discloses a method for electrically separating an external device connected to a BMS.

FIG. 1 is a circuit diagram illustrating a method for disconnecting an external device from a BMS according to a related art.

Referring to FIG. 1, by connecting a plurality of opto-couplers 1-#1~1-#N to signal output terminals of a battery pack P, the battery pack P may be electrically separated from an external device Ex while respectively transmitting information to the external device Ex. According to the related art, to transfer information between the BMS of the battery pack and the external device, a large amount of opto-couplers are needed. In other words, a number of opto-couplers required increases in proportion to a number of output terminals of the BMS. However, because an opto-coupler is an electrical element more expensive than a general electrical element, it is not economically efficient to provide one opto-coupler to each output terminal.

Therefore, there is a need for a method for disconnecting a BMS from an external device with a reduced production cost of the BMS.

DISCLOSURE

Technical Problem

The present disclosure is designed to solve the problem of the related art, and therefore the present disclosure is directed to providing a battery management system that may transmit information or a signal to an external device well while maintaining insulation with the external device, using a small number of opto-couplers to reduce a production cost.

Technical Solution

To achieve the object, a battery management system according to one aspect of the present disclosure is a battery management system which manages a battery pack including at least two battery assemblies connected in a sequential order, and includes at least two battery management devices each having a first terminal outputting a variable voltage and a second terminal outputting a constant voltage, and provided for each battery assembly, at least two slave switch units connected to each other in sequential order, and provided for each battery management device and connected between the first terminal and the second terminal, the slave switch units selectively turning on or turning off based on the variable voltage outputted from the first terminal, and an information transfer unit to transmit information from the battery management device to an external device, wherein among the slave switch units, when a slave switch unit provided in a battery management device intended to transmit information to the external device turns on, the slave switch units turn on in a sequential order toward a last slave switch unit provided the last among the slave switch units, to form an information transfer path to allow the information transfer unit to transmit the information to the external device.

The slave switch unit may have a bipolar junction transistor.

The bipolar junction transistor may be an NPN-type bipolar junction transistor, and a base of the NPN-type bipolar junction transistor may be connected to the second terminal of the battery management device, an emitter of the NPN-type bipolar junction transistor may be connected to the first terminal of the battery management device, and a collector of the NPN-type bipolar junction transistor may be connected to a connector node formed on a line connecting an emitter of an NPN-type bipolar junction transistor an adjacent slave switch unit connected in sequential order has and a first terminal of a battery management device provided with the adjacent slave switch unit.

The battery management system may further include a master switch unit connected between the information transfer unit and the last slave switch unit, and when the last slave switch unit turns on, the master switch unit turns on.

A collector of an NPN-type bipolar junction transistor the last slave switch unit has may be connected to the master switch unit, and when the last slave switch unit turns on and an electric current flows to the collector of the NPN-type bipolar junction transistor the last slave switch unit has, the master switch unit may turn on.

The master switch unit may have a bipolar junction transistor.

The master switch unit may have a PNP-type bipolar junction transistor, and a base of the PNP-type bipolar junction transistor may be connected to the collector of the NPN-type bipolar junction transistor the last slave switch unit has.

An emitter of the PNP-type bipolar junction transistor the master switch unit has may be connected to the second terminal of the battery management device provided with the last slave switch unit.

The collector of the PNP-type bipolar junction transistor the master switch unit has may be connected to one end of the information transfer unit.

A capacitor may be provided on a line connecting the base of the NPN-type bipolar junction transistor and the emitter of the NPN-type bipolar junction transistor.

A diode may be provided on a line connecting the connector node and the first terminal to allow an electric current to flow from the connector node to the first terminal.

The last slave switch unit may be provided in a battery management device which manages a battery assembly with highest potential among the battery assemblies.

The bipolar junction transistor may be a PNP-type bipolar junction transistor, and a base of the PNP-type bipolar junction transistor may be connected to the first terminal of the battery management device, an emitter of the PNP-type bipolar junction transistor may be connected to the second terminal of the battery management device, and a collector of the PNP-type bipolar junction transistor may be connected to a connector node formed on a line connecting an emitter of a PNP-type bipolar junction transistor an adjacent slave switch unit connected in sequential order has and a second terminal of a battery management device provided with the adjacent slave switch unit.

The battery management system may further include a master switch unit connected between the information transfer unit and the last slave switch unit, and when the last slave switch unit turns on, the master switch unit may turn on.

A collector of a PNP-type bipolar junction transistor the last slave switch unit has may be connected to the master switch unit, and when the last slave switch unit turns on and an electric current flows in the collector of the PNP-type bipolar junction transistor the last slave switch unit has, the master switch unit may turn on.

The master switch unit may have a bipolar junction transistor.

The master switch unit may have an NPN-type bipolar junction transistor, and a base of the NPN-type bipolar junction transistor may be connected to the collector of the PNP-type bipolar junction transistor the last slave switch unit has.

An emitter of the NPN-type bipolar junction transistor the master switch unit has may be connected to the second terminal of the battery management device provided with the last slave switch unit.

The collector of the NPN-type bipolar junction transistor the master switch unit has may be connected to one end of the information transfer unit.

A capacitor may be provided on a line connecting the base of the PNP-type bipolar junction transistor and the emitter of the PNP-type bipolar junction transistor.

A diode may be provided on a line connecting the connector node and the second terminal to allow an electric current to flow from the second terminal to the connector node.

The last slave switch unit may be provided in a battery management device which manages a battery assembly with lowest potential among the battery assemblies.

The slave switch unit may turn on when the variable voltage outputted form the first terminal is lower than the constant voltage outputted from the second terminal.

The information transfer unit may be an opto-coupler which disconnects the information transfer unit from the external device while transmitting the information to the external device.

To achieve the object, a battery pack according to another aspect of the present disclosure includes the battery management system described in the foregoing.

To achieve the object, a battery operating system according to still another aspect of the present disclosure includes the battery pack and a load which is supplied with power from the battery pack.

Advantageous Effects

According to the present disclosure, insulation between an external device and a battery management system may be maintained using an opto-coupler. Particularly, according to the present disclosure, information from a battery management device may be effectively transmitted to the external device using a small number of opto-couplers.

BRIEF DESCRIPTION OF THE DRAWINGS

The accompanying drawings illustrate a preferred embodiment of the present disclosure and together with the foregoing disclosure, serve to provide further understanding of the technical spirit of the present disclosure, and thus, the present disclosure is not construed as being limited to the drawing.

MODE FOR CARRYING OUT THE INVENTION

Hereinafter, preferred embodiments of the present disclosure will be described in detail with reference to the accompanying drawings. Prior to the description, it should be understood that the terms used in the specification and the appended claims should not be construed as limited to general and dictionary meanings, but interpreted based on the meanings and concepts corresponding to technical aspects of the present disclosure on the basis of the principle that the inventor is allowed to define terms appropriately for the best explanation. Therefore, the description proposed herein is just a preferable example for the purpose of illustrations only, not intended to limit the scope of the disclosure, so it should be understood that other equivalents and modifications could be made thereto without departing from the spirit and scope of the disclosure.

Figure 1:
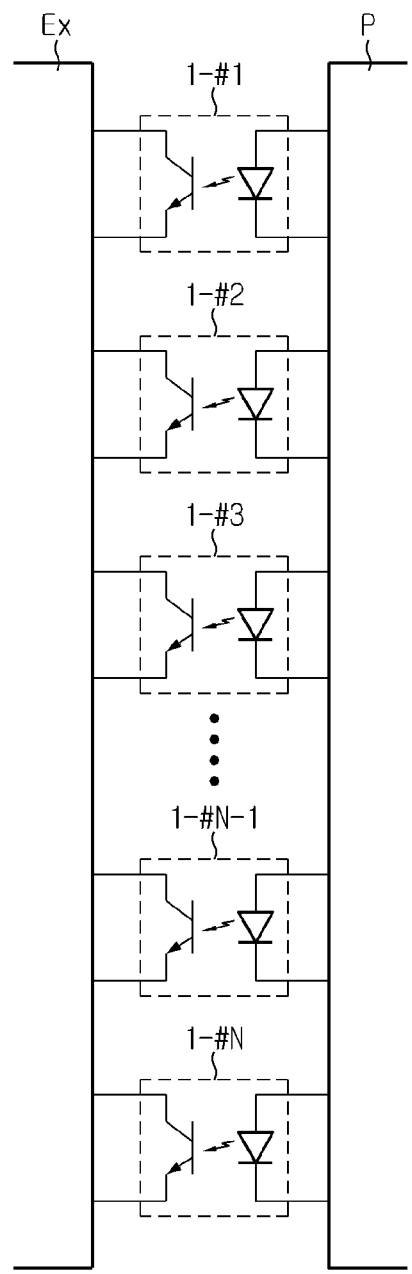
FIG. 1 is a circuit diagram illustrating a method for disconnecting an external device from a battery management system (BMS) according to a related art.
Figure 2:
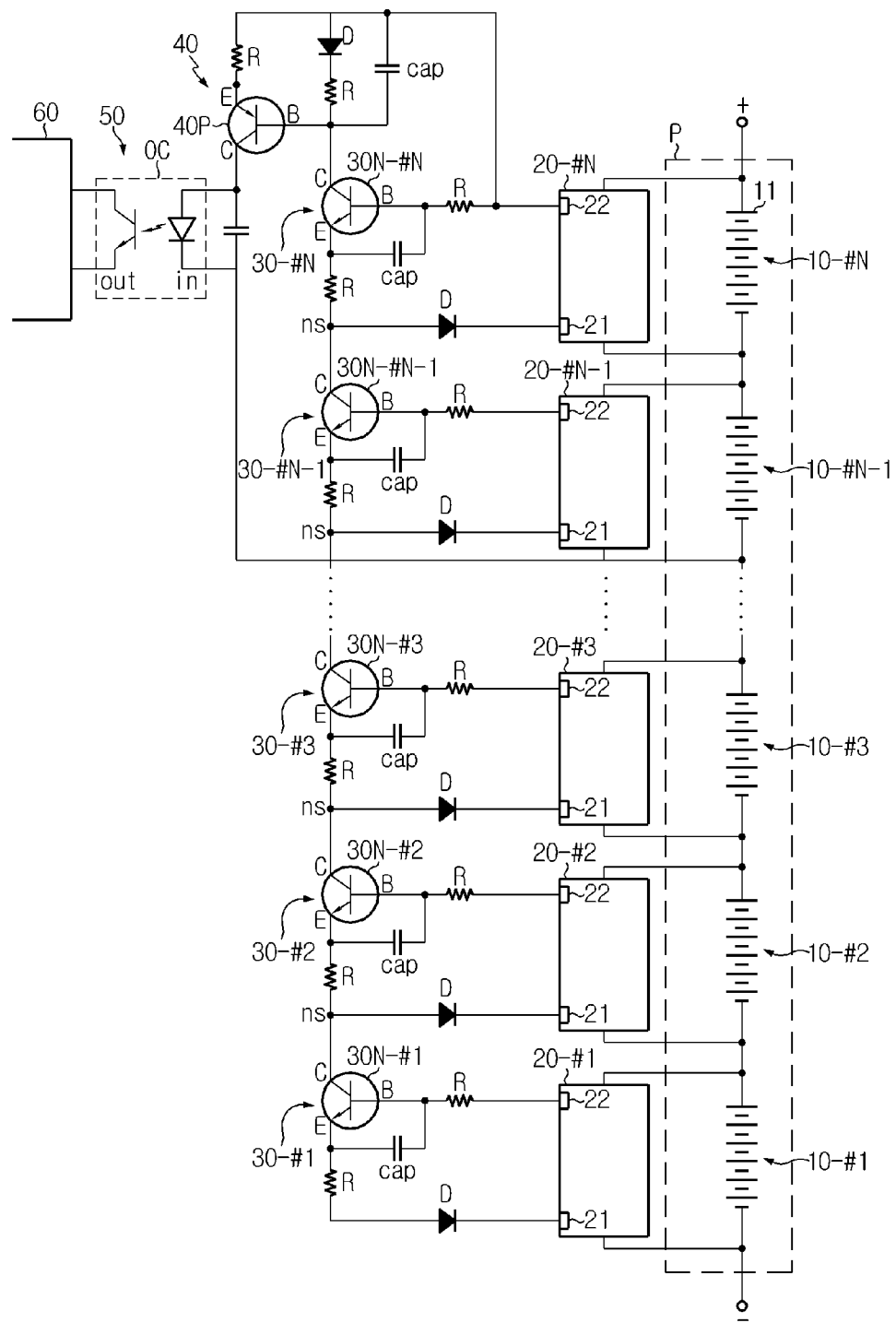
FIG. 2 is a circuit diagram schematically illustrating an architecture of a BMS according to an exemplary embodiment of the present disclosure.

FIG. 2 is a circuit diagram schematically illustrating an architecture of a battery management system (BMS) according to an exemplary embodiment of the present disclosure.

Referring to FIG. 2, The BMS according to an exemplary embodiment of the present disclosure includes at least two battery management devices 20-#1~20-#N, at least two slave switch units 30-#1~30-#N, an information transfer unit 50, and a master switch unit 40.

Also, the BMS according to an exemplary embodiment of the present disclosure manages a battery pack P including at least two battery assemblies 10-#1~10-#N electrically connected to each other. Here, the at least two battery assemblies 10-#1~10-#N may be connected in a sequential order. That is, the at least two battery assemblies 10-#1~10-#N may be connected in series to each other. In other words, as shown in FIG. 2, the at least two battery assemblies 10-#1~10-#N may be connected in a sequential order from to a battery assembly 10-#1 with lowest potential to a battery assembly 10-#N with highest potential. Here, the sequential order does not necessarily represent a direction from low potential to high potential, and includes a connection in a direction from high potential to low potential.

Each battery assembly 10-#1~10-#N includes a single secondary battery cell 11 or an assembly of secondary battery cells 11, and the assembly of secondary battery cells 11 may consist of the secondary battery cells 11 connected either in series or in parallel, or both.

Here, the secondary battery cells 11 are not limited to a particular type. Each secondary battery cell 11 may include a lithium ion battery, a lithium polymer battery, a Ni—Cd battery, a Ni-MH battery and a Ni—Zn battery, that is rechargeable and requires consideration of a charge or discharge voltage. Also, a number of secondary battery cells 11 may be variously set based on an output voltage or charge capacity required. However, the present disclosure is not limited by a type, an output voltage, and a charge capacity of the secondary battery cell 11. Although FIG. 2 shows an exemplary embodiment in which the secondary battery cells 11 are all connected in series, the present disclosure is not limited by a connection method of the secondary battery cells 11.

The battery management devices 20-#1~20-#N may be provided to each battery assembly 10-#1~10-#N to manage the battery assemblies 10-#1~10-#N. That is, at least two battery management devices 20-#1~20-#N may be provided, similar to the battery assemblies 10-#1~10-#N. At least one battery management device may be provided to each battery assembly to manage the corresponding battery assembly. For example, as shown in FIG. 2, a number of battery management devices 20-#1~20-#N corresponding to a number of battery assemblies 10-#1~10-#N may be provided. Thus, a first battery management device 20-#1 may manage a first battery assembly 10-#1, a second battery management device 20-#2 may manage a second battery assembly 10-#2, and an Nth battery management device 20-#N may manage an Nth battery assembly 10-#N.

Specifically, the battery management device 20 may perform various control functions including measurement of electrical characteristic values including voltage or current, charge/discharge control, voltage equalization control, state of charge (SOC) estimation for each secondary battery cell 11 included in the battery assembly 11 the battery management device 20 manages.

Also, the battery management device 20 may receive, from an external device 60, a control signal related to charge and discharge of the battery assembly lithe battery management device 20 manages, and transmit, to the external device 60, and transmit, to the external device 60, information associated with a state of the battery assembly 11 the battery management device 20 manages. In the BMS according to an exemplary embodiment of the present disclosure, the at least two battery management devices 20-#1~20-#N may transmit information associated with the state of the battery assemblies 10-#1~10-#N the battery management devices 20-#1~20-#N manage to the external device 60 through one information transfer unit 50.

Also, the battery management device 20 may have a first terminal 21 and a second terminal 22. Here, the first terminal 21 may output a variable voltage. For example, the first terminal 21 may output a high voltage when information is not transmitted to the external device 60, and output a low voltage when an attempt is made to transmit information to the external device 60. Here, the terms high and low may be used in an absolute sense, but may be used in a relative sense based on a magnitude of constant voltage outputted from the second terminal 22 to be described later. That is, as a result of comparing the variable voltage outputted from the first terminal 21 to the constant voltage outputted from the second terminal 22, when the variable voltage is higher than the constant voltage, the variable voltage may be expressed as a high voltage, and in contrast, as a result of comparing the variable voltage outputted from the first terminal 21 to the constant voltage outputted from the second terminal 22, when the variable voltage is lower than the constant voltage, the variable voltage may be expressed as a low voltage.

The second terminal 22 may output a constant voltage. As described in the foregoing, the 'constant voltage' may be a voltage value enabling the slave switch unit 30 to be turned on when the voltage outputted from the first terminal 21 is lower than the constant voltage. For example, the constant voltage value outputted from the second terminal 22 may be 5V. However, it should be understood that the voltage value outputted from the second terminal 22 may be set in association with the high voltage value outputted from the first terminal 21 to control the turn-on and turn-off of the slave switch unit 30.

For example, the battery management device 20 may be embodied as an integrated circuit (IC), and the first terminal 21 may be a signal pin and the second terminal 22 may be a power pin.

Also, the battery management device 20 may include a regulator to allow the second terminal 22 to output the constant voltage. The regulator refers to a device designed to provide a constant voltage to a circuit, and since the regulator is well known to those skilled in the art, its detailed description is omitted herein.

The information transfer unit 50 may transmit information to the external device 60. Specifically, the information transfer unit 50 may transmit information from a battery management device intended to transmit information to the external device 60 among the at least two battery management devices 20-#1~20-#N to the external device 60. In this instance, the information transfer unit 50 may transmit the information from the battery management device to the external device through an information transfer path created by turning on the slave switch units 30-#1~30-#N in a sequential order.

Preferably, the information transfer unit 50 may be an opto-coupler (OC).

The opto-coupler is a switching device consisting of a light source (input) and a light detector (output). Generally, an infrared light-emitting diode (LED) is used as the light source, and a photodiode or a phototransistor that turns on in response to light is used as the light detector. Thus, when an electric current flows to an input side (in), the light source emits light and the photodiode or phototransistor on an output side (out) turns on. That is, the opto-coupler is a switching element which turns on or turns off by light rather than electrical coupling. Thus, the opto-coupler OC may disconnect the BMS from the external device 60 while transmitting information or a signal to the external device 60.

The slave switch units 30-#1~30-#N may be provided for each battery management device 20-#1~20-#N. That is, at least two slave switch units 30-#1~30-#N may be provided, and at least one slave switch unit 30-#1~30-#N may be provided for each battery management device 20-#1~20-#N.

In this instance, the slave switch units 30-#1~30-#N may be provided for each battery management device 20-#1~20-#N, and may be connected between the first terminal 21 and the second terminal 22. The slave switch units 30-#1~30-#N may be selectively turned on or turned off based on the variable voltage outputted from the first terminal 21.

Also, the slave switch units 30-#1~30-#N may be connected to each other in a sequential order. That is, as shown in FIG. 2, a first slave switch unit 30-#1 may be connected to a second slave switch unit 30-#2, the second slave switch unit 30-#2 may be connected to a third slave switch unit 30-#3, and an N–1th slave switch unit 30-#N–1 may be connected to an Nth slave switch unit 30-#N.

Also, when any one of the slave switch units 30-#1~30-#N turns on, the slave switch units 30-#1~30-#N may turn on in a sequential order. More specifically, when any one of the slave switch units 30-#1~30-#N turns on, the slave switch units 30-#1~30-#N may turn on in a sequential or serial order toward the last slave switch unit 30-#N.

Here, the last slave switch unit corresponds to the slave switch unit 30-#N located the last among the slave switch units. That is, the last slave switch unit corresponds to the slave switch unit 30-#N adjacent to the information transfer unit 50. In the embodiment of FIG. 2, the last slave switch unit 30-#N corresponds to the slave switch unit 30-#N provided in the battery management device 20-#N managing the battery assembly 10-#N with highest potential.

Like this, when the slave switch unit provided in the battery management device intended to transmit information to the external device 60 turns on, the slave switch units 30-#1~30-#N turn on in a sequential order toward the last slave switch unit 30-#N to create an information transfer path along which information may be transmitted from the battery management device to the information transfer unit 50.

Preferably, the BMS may further include a master switch unit 40 connected between the information transfer unit 50 and the last slave switch unit 30-#N.

The master switch unit 40 may be provided between the information transfer unit 50 and the slave switch units 30-#1~30-#N. More specifically, the master switch unit 40 may be provided between the last slave switch unit 30-#N located the last among the slave switch units 30-#1~30-#N and the information transfer unit 50 to directly connect the last slave switch unit 30-#N to the information transfer unit 50.

Also, the master switch unit 40 may be configured to turn on when the last slave switch unit 30-#N turns on.

Thus, when any one of the slave switch units 30-#1~30-#N turns on, the slave switch units 30-#1~30-#N turn on in a sequential order from the turned-on slave switch unit to the last slave switch unit 30-#N. As a consequence, when the last slave switch unit 30-#N turns on, the master switch unit 40 turns on and the information transfer unit 50 may transmit information to the external device 60.

Hereinafter, a specific embodiment for implementing the operation will be described.

The slave switch unit may have a bipolar junction transistor (BJT). That is, the slave switch unit may use the bipolar junction transistor as a switching device.

For example, the slave switch units may have NPN-type bipolar junction transistors. That is, as shown in FIG. 2, the slave switch units 30-#1~30-#N may be implemented as NPN-type bipolar junction transistors 30N-#1~30N-#N.

The NPN-type bipolar junction transistors 30-#1~30-#N each may have three terminals. That is, the NPN-type bipolar junction transistor may have three terminals including a base B, an emitter E, and a collector C. When an electric current is inputted in the base B, the NPN-type bipolar junction transistor turns on to flow the electric current between the emitter E and the collector C.

The NPN-type bipolar junction transistor may be provided for each battery management device 20-#1~20-#N. In this instance, the base B may be connected to the second terminal 22 of the battery management device, and the emitter E may be connected to the first terminal 21 of the battery management device. Also, the collector C may be connected to an NPN-type bipolar junction transistor an adjacent slave switch unit has. More specifically, the collector C may be connected to a connector node (ns) formed on a line connecting an emitter E of the NPN-type bipolar junction transistor the adjacent slave switch unit has and a first terminal 21 of the battery management device provided with the slave switch unit. As a result, the collector C of the NPN-type bipolar junction transistor, the emitter E of the adjacent NPN-type bipolar junction transistor, and the first terminal 21 of the battery management device provided with the adjacent slave switch unit may be connected to each other through the connector node (ns).

Referring back to FIG. 2, a detailed description thereof is provided below.

First, seeing the second slave switch unit 30-#2 of FIG. 2, the second slave switch unit 30-#2 has a second NPN-type bipolar junction transistor 30N-#2, and the second NPN-type bipolar junction transistor 30N-#2 has a base B, an emitter E, and a collector C. The base B is connected to the second terminal 22 of the second battery management device 20-#2. Also, the emitter E is connected to the first terminal 21 of the second battery management device 20-#2. Also, the collector C is connected to a connector node (ns) between the second slave switch unit 30-#2 and the third slave switch unit 30-#3. The connector node (ns) is connected to the collector C, an emitter E of a third NPN-type bipolar junction transistor 30N-#3 adjacent thereto, and the first terminal 21 of the third battery management device 20-#3 provided with the third slave switch unit 30-#3 adjacent thereto.

In this manner, when any one of the slave switch units 30-#1~30-#N connected to each other turns on, the remaining slave switch units turn on in a sequential order. For example, the case is given in which the variable voltage outputted from the first terminal 21 of the second battery management device 20-#2 is lower than the constant voltage outputted from the second terminal 22. As the voltage from the second terminal 22 is higher than the voltage from the first terminal 21, an electric current flows to the base B of the second NPN-type bipolar junction transistor 30N-#2, and consequently between the emitter E and the collector C of the second NPN-type bipolar junction transistor 30N-#2. Thus, the second slave switch unit 30-#2 turns on.

As the electric current flows between the emitter E and the collector C of the second slave switch unit 30-#2, the electric current flows to the base B of the third NPN-type bipolar junction transistor 30N-#3. Accordingly, the electric current flows between the emitter E and the collector C of the third NPN-type bipolar junction transistor 30N-#3. Thus, the third slave switch unit 30-#3 turns on.

By this method, the fourth slave switch unit 30-#4 to the N−1th slave switch unit 30-#N−1 and the last slave switch unit, i.e., the Nth slave switch unit 30-#N may turn on in a serial order. Then, an information transfer path may be formed to allow the second battery management device 20-#2 to transmit information to the external device 60.

As described in the foregoing, the master switch unit 40 may be connected between the information transfer unit 50 and the last slave switch unit 30-#N. In this instance, the master switch unit 40 may be implemented to turn on when an electric current flows to a collector C of an NPN-type bipolar junction transistor 30N-#N the last slave switch unit 30-#N has.

Also, the master switch unit 40 may be embodied as a bipolar junction transistor similar to the slave switch unit 30. For example, the master switch unit 40 may have a PNP-type bipolar junction transistor.

The PNP-type bipolar junction transistor may be implemented such that a base is connected to the collector of the NPN-type bipolar junction transistor the last slave switch unit has, and when the last slave switch unit turns on, an electric current flows to the base of the PNP-type bipolar junction transistor and consequently between an emitter and a collector of the PNP-type bipolar junction transistor.

More specifically, as shown in FIG. 2, the emitter E of the PNP-type bipolar junction transistor 40P the master switch unit 40 has may be connected to the second terminal 22 of the Nth battery management device 20-#N provided with the last slave switch unit 30-#N, and the collector C of the PNP-type bipolar junction transistor 40P the master switch unit 40 has may be connected to one end of the information transfer unit 50. More specifically, the collector C may be electrically connected to a high potential terminal on an input side (in) of the information transfer unit 50.

Hereinafter, an operation in the exemplary embodiment in which the master switch unit 40 is embodied as the PNP-type bipolar junction transistor 40P is described with reference to FIG. 2.

For example, the case is given in which the second battery management device 20-#2 intends to transmit information. In this case, the first terminal 21 of the second battery management device 20-#2 outputs a lower voltage than the constant voltage outputted from the second terminal 22. As the voltage from the second terminal 22 is higher than the voltage from the first terminal 21, an electric current flows to the base B of the second NPN-type bipolar junction transistor 30N-#2, and consequently between the emitter E and the collector C of the second NPN-type bipolar junction transistor 30N-#2. Thus, the second slave switch unit 30-#2 turns on.

As the electric current flows between the emitter E and the collector C of the second NPN-type bipolar junction transistor 30N-#2, the electric current flows to the base B of the third NPN-type bipolar junction transistor 30N-#3. Then, the electric current flows between the emitter E and the collector C of the third NPN-type bipolar junction transistor 30N-#3. Thus, the third slave switch unit 30-#3 turns on.

By this method, the fourth slave switch unit 30-#4 to the N−1th slave switch unit 30-#N−1 and the last slave switch unit, i.e., the Nth slave switch unit 30-#N may turn on in a serial order. When the last slave switch unit, i.e., the Nth slave switch unit 30-#N turns on, the electric current flows between an emitter E and a collector C of the Nth NPN-type bipolar junction transistor 30N-#N. Then, the electric current flows to the base B of the PNP-type bipolar junction transistor 40P of the master switch unit 40 connected to the collector C of the Nth NPN-type bipolar junction transistor 30N-#N. As a result, the electric current flows between the emitter E and the collector C of the PNP-type bipolar junction transistor 40P, and consequently to the opto-coupler OC connected to the collector C of the PNP-type bipolar junction transistor 40P.

Although FIG. 2 shows the other end of the opto-coupler is connected to the bottom of the N−1th battery assembly 10-#N−1, a connection configuration of the opto-coupler OC of the present disclosure is not limited thereto. This is set in consideration of the internal pressure of the PNP-type bipolar junction transistor 40P comprising the master switch unit and the opto-coupler OC, and it is obvious that the other end of the opto-coupler OC may be connected in a different manner.

As described in the foregoing, when the slave switch unit 30 and the master switch unit 40 turn on, the battery management device 20 may transmit information associated with the battery assembly 10 the battery management device 20 manages to the external device 60 using the opto-coupler OC. For example, the battery management device 20 may transmit information to the external device 60 when a dangerous situation caused by overcharge such as an explosion occurs in the battery assembly 10 the battery management device 20 manages.

Although the terms 'master' and 'slave' used herein are used to distinguish the slave switch unit 30 from the master switch unit 40, it does not imply a relationship in which the master switch unit 40 transmits a control (command) signal to the slave switch unit 30.

Preferably, a capacitor (cap) may be provided between the base B and the emitter E of the NPN-type bipolar junction transistor 30N provided in the slave switch unit 30. That is, the capacitor (cap) may be provided on a line connecting the base B and the emitter E. The capacitor (cap) serves to reduce a malfunction caused by noise during operation of the NPN-type bipolar junction transistor 30N provided in the slave switch unit 30. That is, the capacitor (cap) serves as a voltage buffer to stabilize the turn-on and turn-off operations of the plurality of slave switch units 30-#1~30-#N and the master switch unit 40.

Also, preferably, a diode D may be provided on a line connecting the connector node (ns) and the first terminal 21. In this instance, the diode D may be provided to direct an electric current to flow from the connector node (ns) to the first terminal 21, as shown in FIG. 2. The diode D keeps an electric current from flowing to the first terminal 21 to prevent the battery management device 20 from being damaged. For example, the battery management device 20 may be damaged when an electric current flows from the first terminal with high potential to the first terminal with low potential, and the diode D may prevent such a flow of electric current.

Also, the master switch unit 40 may be equipped with a capacitor (cap) to stabilize the operation, and a diode D to prevent the element from being damaged (see FIG. 2).

In addition, the BMS according to an exemplary embodiment of the present disclosure may further include a protection resistor R to prevent an overcharge.

Hereinabove, the slave switch unit comprising the NPN-type bipolar junction transistor has been described, and now a BMS according to another exemplary embodiment of the present disclosure will be described. The description of the BMS according to an exemplary embodiment of the present disclosure as above will be equally applied to the BMS according to another exemplary embodiment of the present disclosure, and an overlapping description is omitted herein.

The BMS according to another exemplary embodiment of the present disclosure may include a slave switch unit comprising a PNP-type bipolar junction transistor.

Figure 3:
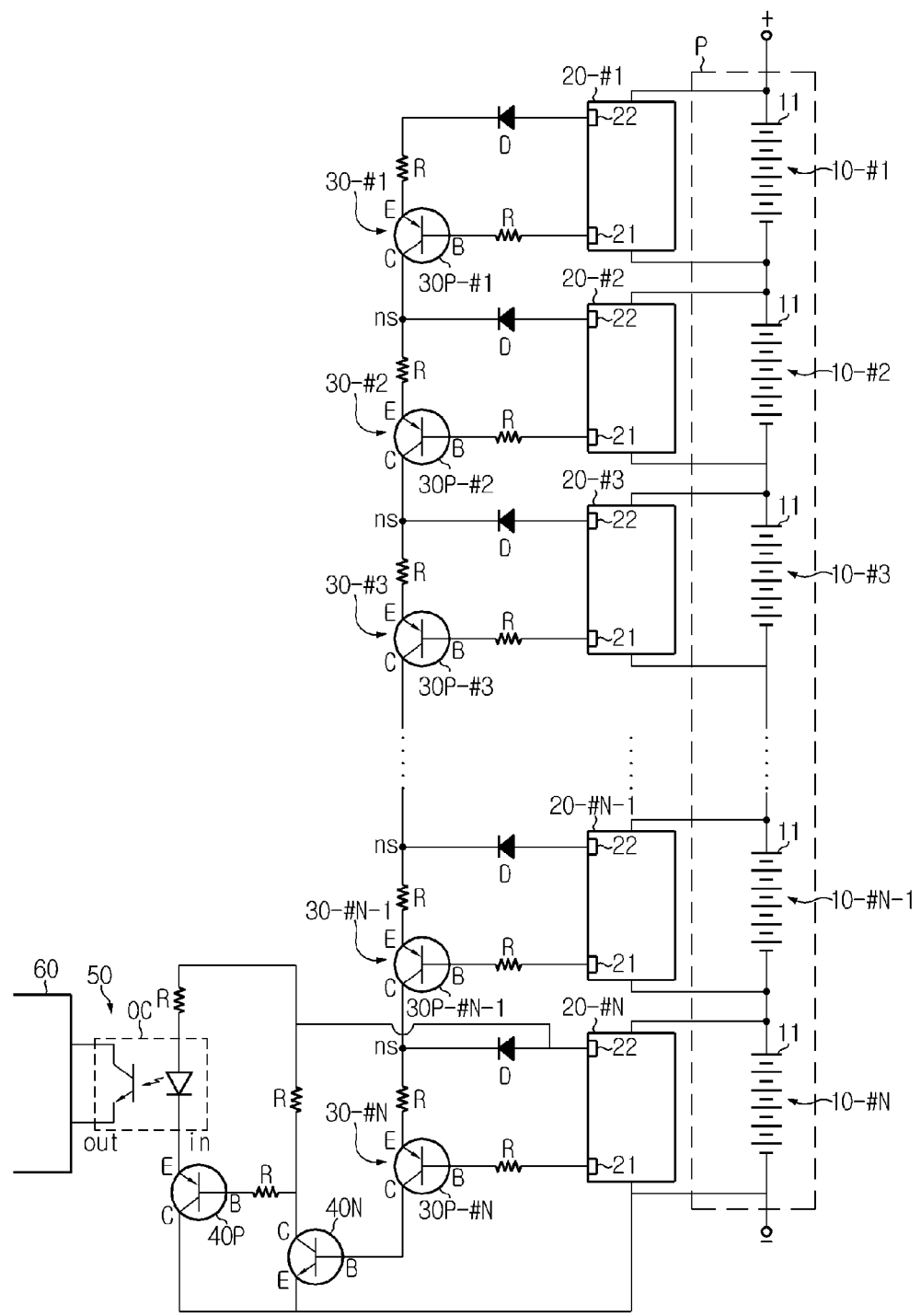
FIG. 3 is a circuit diagram schematically illustrating an architecture of a BMS according to another exemplary embodiment of the present disclosure.

FIG. 3 is a circuit diagram schematically illustrating an architecture of the BMS according to another exemplary embodiment of the present disclosure.

Referring to FIG. 3, a turn-on order of the slave switch unit 30 of the BMS according to another exemplary embodiment of the present disclosure is contrary to that of the BMS according to an exemplary embodiment of the present disclosure described in the foregoing. That is, according to another exemplary embodiment of the present disclosure, the slave switch unit 30-#1 with high potential turns on first, and then the slave switch units turn on in a sequential order toward low potential.

The slave switch unit 30 has a PNP-type bipolar junction transistor 30P. A base B of the PNP-type bipolar junction transistor 30P is connected to the first terminal 21 of a battery management device 20. Also, an emitter E of the PNP-type bipolar junction transistor 30P is connected to the second terminal 22 of the battery management device 20. Also, a collector C of the PNP-type bipolar junction transistor 30P is connected to a connector node (ns) formed on a line connecting an emitter E of a PNP-type bipolar junction transistor 30P an adjacent slave switch unit 30 connected in sequential order has and the second terminal 22 of the battery management device 20 provided with the adjacent slave switch unit 30.

Also, a diode D is connected on a line connecting the connector node (ns) and the second terminal 22. Here, the diode D is designed to allow an electric current to flow from the second terminal 22 to the connector node (ns).

Although not shown in FIG. 3, a capacitor may be provided on a line connecting the base B and the emitter E of the PNP-type bipolar junction transistor 30P.

Among the slave switch units 30-#1~30-#N, the last slave switch unit 30-#N is provided in the battery management device 20-#N which manages the battery assembly 10-#N with lowest potential among the battery assemblies 10-#1~10-#N. Also, the last slave switch unit 30-#N is connected to the master switch unit 40, and the master switch unit 40 is configured to turn on when the last slave switch unit 30-#N turns on.

More specifically, in the case of the BMS according to another exemplary embodiment of the present disclosure, the master switch unit 40 has an NPN-type bipolar junction transistor 40N. A base B of the NPN-type bipolar junction transistor 40N is connected to the collector C of the PNP-type bipolar junction transistor 30P-#N the last slave switch unit 30-#N has. Also, an emitter E of the NPN-type bipolar junction transistor 40N is connected to the second terminal 22 of the battery management device 20-#N provided with the last slave switch unit 30-#N. Also, a collector C of the NPN-type bipolar junction transistor 40N is connected to one end of the information transfer unit 50 embodied as an opto-coupler OC and the bottom (low potential) of the first battery management device.

In this instance, the opto-coupler OC and the collector C of the NPN-type bipolar junction transistor 40N are connected by the medium of the PNP-type bipolar junction transistor 40P. That is, the master switch unit 40 of the BMS according to another exemplary embodiment of the present disclosure is constructed by a combination of the PNP-type bipolar junction transistor 40P and the NPN-type bipolar junction transistor 40N. A base B of the PNP-type bipolar junction transistor 40P comprising the master switch unit 40 is connected to the collector C of the NPN-type bipolar junction transistor 40N. Thus, when the NPN-type bipolar junction transistor 40N turns on and an electric current flows between the emitter E and the collector C of the NPN-type bipolar junction transistor 40N, the electric current flows to the base B of the PNP-type bipolar junction transistor 40P comprising the master switch unit 40 and the PNP-type bipolar junction transistor 40P turns on. When the PNP-type bipolar junction transistor 40P turns on, the electric current flows to an input end (in) of the opto-coupler OC. In FIG. 3, one end of the opto-coupler is connected to the second terminal of the first battery management device, and the other is connected to the emitter E of the PNP-type bipolar junction transistor 40P comprising the master switch unit 40.

According to this embodiment, when the battery management device intended to transmit information outputs a low voltage to the first terminal 21, the slave switch unit 30 connected to the battery management device 20 intended to transmit information turns on, and the slave switch units 30-#1~30-#N turn on in a sequential order toward the slave switch unit connected to the battery management device with low voltage. As a result, the last slave switch unit 30-#N provided in the battery management device 20-#N managing the battery assembly 10-#N with lowest potential among the battery assemblies 10-#1~10-#N turns on, and the master switch unit 40 turns on. Specifically, when the NPN-type bipolar junction transistor 40N turns on and then the PNP-type bipolar junction transistor 40P turns on, an electric current flows through the opto-coupler OC.

The BMS according to the present disclosure may be one component of a battery pack including the BMS and at least two battery assemblies electrically connected to each other.

Also, the battery pack according to the present disclosure may be one component of a battery operating system including the battery pack and a load which is supplied with power from the battery pack.

The battery operating system may include, for example, an electric vehicle (EV), a hybrid electric vehicle (HEV), an electric bike (E-Bike), a power tool, an energy storage system, an uninterruptible power supply (UPS), a portable computer, a mobile phone, a portable audio device, a portable video device, and the like, and the load may include, for example, a motor that generates a rotational force by power supplied from the battery pack, or a power inverter circuit that inverts power supplied from the battery pack to power required for various circuit components.

According to the present disclosure, the BMS may be electrically separated from the external device using a small number of opto-couplers. Thus, the BMS may reduce in manufacturing cost.

In the description of the present disclosure, it should be understood that each element of the present disclosure is distinguished logically rather than physically.

That is, each element corresponds to a logic element to realize the technical spirit of the present disclosure, and accordingly, even though each element is integrated or separated, it should be construed as falling within the scope of the present disclosure if a function performed by a logic element of the present disclosure can be implemented, and it should be understood that it falls within the scope of the present disclosure regardless of whether names are identical or not if it is an element performing an identical or similar function.

While the present disclosure has been hereinabove described in connection with only a limited number of embodiments and drawings, the present disclosure is not limited thereto and it should be understood that various changes and modifications may be made by an ordinary person skilled in the art within the spirit and scope of the disclosure and the appended claims and their equivalents.

What is claimed is:

1. A battery management system which manages a battery pack including at least two battery assemblies connected in a sequential order, the battery management system comprising:
    at least two battery management devices each having a first terminal outputting a variable voltage and a second terminal outputting a constant voltage, and provided for each battery assembly;
    at least two slave switch units connected to each other in sequential order, and provided for each battery management device and connected between the first terminal and the second terminal, the slave switch units selectively turning on or turning off based on the variable voltage outputted from the first terminal; and
    an information transfer unit to transmit information from the battery management device to an external device,
    wherein among the slave switch units, when a slave switch unit provided in a battery management device intended to transmit information to the external device turns on, the slave switch units turn on in a sequential order toward a last slave switch unit provided the last among the slave switch units, to form an information transfer path to allow the information transfer unit to transmit the information to the external device.

2. The battery management system according to claim 1, wherein the slave switch unit has a bipolar junction transistor.

3. The battery management system according to claim 2, wherein the bipolar junction transistor is an NPN-type bipolar junction transistor,
    a base of the NPN-type bipolar junction transistor is connected to the second terminal of the battery management device,
    an emitter of the NPN-type bipolar junction transistor is connected to the first terminal of the battery management device, and
    a collector of the NPN-type bipolar junction transistor is connected to a connector node formed on a line connecting an emitter of an NPN-type bipolar junction transistor an adjacent slave switch unit connected in sequential order has and a first terminal of a battery management device provided with the adjacent slave switch unit.

4. The battery management system according to claim 3, further comprising:
    a master switch unit connected between the information transfer unit and the last slave switch unit, and when the last slave switch unit turns on, the master switch unit turns on.

5. The battery management system according to claim 4, wherein a collector of an NPN-type bipolar junction transistor the last slave switch unit has is connected to the master switch unit, and when the last slave switch unit turns on and an electric current flows to the collector of the NPN-type bipolar junction transistor the last slave switch unit has, the master switch unit turns on.

6. The battery management system according to claim 5, wherein the master switch unit has a bipolar junction transistor.

7. The battery management system according to claim 6, wherein the master switch unit has a PNP-type bipolar junction transistor, and
    a base of the PNP-type bipolar junction transistor is connected to the collector of the NPN-type bipolar junction transistor the last slave switch unit has.

8. The battery management system according to claim 7, wherein an emitter of the PNP-type bipolar junction transistor the master switch unit has is connected to the second terminal of the battery management device provided with the last slave switch unit.

9. The battery management system according to claim 8, wherein the collector of the PNP-type bipolar junction transistor the master switch unit has is connected to one end of the information transfer unit.

10. The battery management system according to claim 3, wherein a capacitor is provided on a line connecting the base of the NPN-type bipolar junction transistor and the emitter of the NPN-type bipolar junction transistor.

11. The battery management system according to claim 3, wherein a diode is provided on a line connecting the connector node and the first terminal to allow an electric current to flow from the connector node to the first terminal.

12. The battery management system according to claim 3, wherein the last slave switch unit is provided in a battery management device which manages a battery assembly with highest potential among the battery assemblies.

13. The battery management system according to claim 2, wherein the bipolar junction transistor is a PNP-type bipolar junction transistor,
    a base of the PNP-type bipolar junction transistor is connected to the first terminal of the battery management device,
    an emitter of the PNP-type bipolar junction transistor is connected to the second terminal of the battery management device, and
    a collector of the PNP-type bipolar junction transistor is connected to a connector node formed on a line connecting an emitter of a PNP-type bipolar junction transistor an adjacent slave switch unit connected in sequential order has and a second terminal of a battery management device provided with the adjacent slave switch unit.

14. The battery management system according to claim 13, further comprising:
    a master switch unit connected between the information transfer unit and the last slave switch unit, and when the last slave switch unit turns on, the master switch unit turns on.

15. The battery management system according to claim 14, wherein a collector of a PNP-type bipolar junction transistor the last slave switch unit has is connected to the master switch unit, and when the last slave switch unit turns on and an electric current flows in the collector of the PNP-type bipolar junction transistor the last slave switch unit has, the master switch unit turns on.

16. The battery management system according to claim 15, wherein the master switch unit has a bipolar junction transistor.

17. The battery management system according to claim 16, wherein the master switch unit has an NPN-type bipolar junction transistor, and a base of the NPN-type bipolar junction transistor is connected to the collector of the PNP-type bipolar junction transistor the last slave switch unit has.

18. The battery management system according to claim 17, wherein an emitter of the NPN-type bipolar junction transistor the master switch unit has is connected to the second terminal of the battery management device provided with the last slave switch unit.

19. The battery management system according to claim 18, wherein the collector of the NPN-type bipolar junction transistor the master switch unit has is connected to one end of the information transfer unit.

20. The battery management system according to claim 14, wherein a capacitor is provided on a line connecting the base of the PNP-type bipolar junction transistor and the emitter of the PNP-type bipolar junction transistor.

21. The battery management system according to claim 14, wherein a diode is provided on a line connecting the connector node and the second terminal to allow an electric current to flow from the second terminal to the connector node.

22. The battery management system according to claim 14, wherein the last slave switch unit is provided in a battery management device which manages a battery assembly with lowest potential among the battery assemblies.

23. The battery management system according to claim 1, wherein the slave switch unit turns on when the variable voltage outputted form the first terminal is lower than the constant voltage outputted from the second terminal.

24. The battery management system according to claim 1, wherein the information transfer unit is an opto-coupler which disconnects the information transfer unit from the external device while transmitting the information to the external device.

25. A battery pack comprising:
a battery management system according to claim 1.

26. A battery operating system comprising:
a battery pack according to claim 25; and
a load which is supplied with power from the battery pack.

* * * * *